US009883148B2

(12) United States Patent
Seger et al.

(10) Patent No.: US 9,883,148 B2
(45) Date of Patent: Jan. 30, 2018

(54) COLOR MASK FOR AN IMAGE SENSOR OF A VEHICLE CAMERA

(75) Inventors: Ulrich Seger, Leonberg-Warmbronn (DE); Alexander Wuerz-Wessel, Stuttgart (DE); Paul Ruhnau, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1162 days.

(21) Appl. No.: 13/639,034

(22) PCT Filed: Feb. 9, 2011

(86) PCT No.: PCT/EP2011/051849
§ 371 (c)(1),
(2), (4) Date: May 20, 2013

(87) PCT Pub. No.: WO2011/124406
PCT Pub. Date: Oct. 13, 2011

(65) Prior Publication Data
US 2013/0027560 A1   Jan. 31, 2013

(30) Foreign Application Priority Data
Apr. 7, 2010   (DE) .................. 10 2010 003 668

(51) Int. Cl.
*H04N 9/64*   (2006.01)
*G02B 5/20*   (2006.01)
(Continued)

(52) U.S. Cl.
CPC ............. *H04N 9/045* (2013.01); *H04N 9/735* (2013.01)

(58) Field of Classification Search
CPC ........... G06K 9/00798; G06K 9/00818; G06K 9/2018; G06K 9/00825; G06K 2207/1012;
(Continued)

(56) References Cited

U.S. PATENT DOCUMENTS

2004/0021853 A1*   2/2004   Stam ................... B60Q 1/1423
356/218
2007/0177014 A1*   8/2007   Frenzel .............. G06K 9/00798
348/148
(Continued)

FOREIGN PATENT DOCUMENTS

DE   10 2008 031593   1/2010
DE   10 2008 044 325   6/2010
(Continued)

OTHER PUBLICATIONS

English translation for DE 102013001644 A1.*

*Primary Examiner* — Dave Czekaj
*Assistant Examiner* — Alison Slater
(74) *Attorney, Agent, or Firm* — Norton Rose Fulbright US LLP; Gerard Messina (57) ABSTRACT

A color mask for an image sensor of a vehicle camera, the color mask having a matrix configuration of filter pixels having different spectral transmission behaviors, some filter pixels being transparent filter pixels, which are at least essentially uniformly transparent for optical light, and additional filter pixels being color pixels having a wavelength-selective transmission behavior, the color mask having a color pattern as a repeating configuration of filter pixels having a specific transmission behavior. The color mask has a central area having a first color pattern and a lower area and/or an upper area having a second color pattern, the first
(Continued)

color pattern and the second color pattern being different, and the first color pattern containing transparent filter pixels.

25 Claims, 5 Drawing Sheets (51) Int. Cl.
*H04N 9/04* (2006.01)
*H04N 9/73* (2006.01)

(58) Field of Classification Search
CPC  H04N 9/045; H04N 9/04; H04N 9/07; H04N 9/735; H04N 5/369; H04N 9/64; H04N 5/23238; H04N 5/335; H04N 1/407; H04N 1/60; H04N 2209/046; H04N 2209/047; H04N 5/225; H04N 5/2258; H04N 5/232; H04N 5/23245; H04N 5/235; B60R 1/00; B60R 2300/10; B60R 2300/105; B60R 2300/30; B60R 2300/607; G02B 5/20; G06T 1/0007; G06T 2207/10024; G06T 2207/30252; G06T 3/4015; G06T 5/001; G06T 7/00; G06T 7/004; B60Q 1/143; B60Q 2300/3321; B60Q 2300/41

See application file for complete search history.

(56) References Cited

U.S. PATENT DOCUMENTS

| | | | |
|---|---|---|---|
| 2009/0200451 A1* | 8/2009 | Conners | H04N 5/2351 250/208.1 |
| 2009/0295973 A1 | 12/2009 | Oshikubo et al. | |
| 2010/0214455 A1* | 8/2010 | Simon | G06T 3/4015 348/273 |
| 2010/0259628 A1* | 10/2010 | Rous | H04N 9/045 348/222.1 |
| 2011/0026153 A1* | 2/2011 | Yoshibayashi | G02B 5/201 359/891 |
| 2011/0069189 A1* | 3/2011 | Venkataraman | H01L 27/14618 348/218.1 |
| 2012/0008023 A1* | 1/2012 | Wajs | H04N 1/409 348/273 |

FOREIGN PATENT DOCUMENTS

| | | | |
|---|---|---|---|
| DE | 102013001644 A1 * | 7/2014 | H04N 5/23238 |
| JP | 2002-26304 | 1/2002 | |
| JP | 2004/304706 | 5/2006 | |
| JP | 2007-538440 | 12/2007 | |
| JP | 2010-44472 | 2/2010 | |
| WO | 2005/115820 | 12/2005 | |
| WO | 2009/013073 | 1/2009 | |
| WO | 2009/027134 | 3/2009 | |

* cited by examiner

COLOR MASK FOR AN IMAGE SENSOR OF A VEHICLE CAMERA

FIELD OF THE INVENTION

The present invention relates to a color mask for an image sensor of a vehicle camera, the color mask having a matrix configuration of filter pixels having different spectral transmission behaviors.

BACKGROUND INFORMATION

Vehicle cameras are used in particular to detect vehicle surroundings in front of the vehicle, to represent an image on a display unit, to analyze the images detected and for use in driver assistance systems, objects being identified in the image detected. Thus, for example, additional traffic participants, lane markings, traffic signs and traffic lighting may be ascertained. To evaluate the relevance of objects, their color is also important in particular. Thus with simultaneous occurrence of yellow and white lane markings, for example, in a construction area, the yellow markings generally have priority. In addition, light signals may be assigned according to their color value, rear lights having a red color value being differentiated from headlights having a white or yellow color value, for example, and taillights having a yellow color value. Traffic signs and traffic lighting, such as traffic lights and flashing lights, are also relevant in accordance with their particular color value.

It is believed to be understood in this regard that a color classification of the objects detected may be performed. However, the color in the image detected may be represented differently because of the color temperature of the surroundings, which depends on the color of the lighting and the average color value. Different color temperatures of the image detected may result first of all due to different lighting, e.g., depending on the time of day, different road lighting and also due to tints of the vehicle windows behind which the vehicle cameras are generally mounted. The tints of the vehicle windows are initially unknown because they may vary greatly, depending on the model, and to some extent may vary as a function of the position on the vehicle window. In general, the assumption of a "gray world" in which the histograms (statistical data) of the color pixels and intensity pixels are uniformly occupied over the entire image is not correct. In this regard, a color temperature determination of the detected image area is performed in more complex systems to perform a white balance in which the color temperature of the surroundings is subtracted out, i.e., corrected, to be able to correctly classify the color of the object.

For differentiation of colors, color masks whose filter pixels have a specific color value, i.e., a specific transmission behavior in the optical wavelength range, are usually placed in front of the sensitive sensor pixel area. In general, the color masks have specific color patterns, which are formed by periodic repetition of specific basic patterns, for example, as blocks of four pixels each having specific color values, e.g., R (red), G (green), B (blue). Patent documents JP 2004304706 A and WO 2009/027134 A1 refer to such color masks having specific color patterns. However, due to the use of such color patterns, the local resolution decreases because a block of four pixels having different color values is used for one pixel. In addition, due to the filtering, the intensity of the incident light declines and thus its sensitivity also declines. In nighttime applications, for example, a light control function for automatically switching between high beam and low beam, remote light sources must be detected in some cases, which requires a high resolution and high sensitivity. However, the local resolution is reduced in particular in full-color patterns, e.g., RGGB, and the intensity of the incident light is diminished. Partial color patterns, as described in WO 2009/027134 A1, form a compromise between color classification by the particular color filter pixels and resolution or high sensitivity due to the transparent filter pixels.

Thus, in addition to the accuracy of the color determination, the local resolution and light sensitivity as well as the local resolution of the color values or chrominance and the local resolution of the brightness are still relevant features for vehicle cameras and driver assistance systems.

SUMMARY OF THE INVENTION

According to the exemplary embodiments and/or exemplary methods of the present invention, the color mask is implemented with the aid of different color patterns in different areas. A subdivision essentially in the vertical direction is performed here, with a central area and a (which may be smaller) upper area and/or lower area.

The exemplary embodiments and/or exemplary methods of the present invention are based here on the knowledge that in a typical image, which is detected by a vehicle camera situated behind the windshield, for example, a lower image area will detect the road, i.e., the road surface in front of the vehicle, the road surface generally being formed from asphalt or possibly concrete and thus representing a gray value without any great coloration, which may range from anthracite black to light gray, depending on the composition of the road surface and the particular lighting situation. In general, however, an upper image area images the sky, which also represents the essential lighting source, in particular in daylight situations. These areas may in general be assessed as not so relevant for the evaluation for driver assistance systems, the lower image area often imaging the section of road surface directly in front of the vehicle, which is also traveled, if immediate driving dynamic intervention measures are initiated.

An ambient temperature or color temperature of the surroundings may thus be determined from this upper and/or lower image area, in particular also a combination of these image areas. Thus according to the exemplary embodiments and/or exemplary methods of the present invention, color patterns having a smaller relative number of transparent filter pixels are used for these image areas, in particular full-color patterns without transparent filter pixels, e.g., RGGB. It is recognized according to the exemplary embodiments and/or exemplary methods of the present invention that the local resolution in these areas is not so relevant in general because more relevant objects are not to be expected here as often or they are not to be imaged with a very high local resolution.

The color determination in the upper area and/or lower area may thus be used for the white balance or the color correction of the pixel signals of the central image area. For this central image area, a color pattern having a higher proportion of transparent filter pixels, i.e., in particular a partial color pattern, is provided, offering a compromise between higher resolution and color determination, which may also be with high local resolution of the chrominance and local resolution of the luminance, i.e., color-differentiated local resolution and brightness-differentiated local resolution.

There are thus some advantages according to the exemplary embodiments and/or exemplary methods of the present invention. With the aid of the partial color pattern having transparent filter pixels, a detection of objects in the central image area, which is relevant thereto, is ascertained with a high local resolution, and nevertheless good color determination or high locally resolved chrominance, and a correction or white balance of the color values of the central image area is made possible through the upper and/or lower image areas. This white balance may take place dynamically or in the particular driving situations and lighting situations without additional sensors and without relevant interference with the image processing. This white balance or the correction may fundamentally be performed purely through the software in the control and analyzing unit and thus does not require any additional hardware expenditure. Furthermore, the control and analyzing unit used may also assess continuously occurring tints and colorations as being permanent, for example, as the tint of the windshield or a persistent soiling.

This may also eliminate a more complex consideration of different color patterns in the central image area because a single partial color pattern, in particular, may be provided there, so that the histogram creation for the camera regulation or edge detection may be set on this partial color pattern for detecting lanes and objects. Thus, according to the exemplary embodiments and/or exemplary methods of the present invention, rapid processing of data using relatively little hardware is possible.

The second color pattern of the upper area may essentially also be different from a second color pattern of the lower area.

Furthermore, the upper and lower areas of the color mask may have different sizes. They may extend over complete lines of the pixel array or they may also include only central pixels in the horizontal direction, so that the central area may extend laterally to close proximity of the upper area and to the upper edge of the color mask and/or may extend laterally to close proximity of the lower area up to the lower edge of the color mask. This is based on the knowledge that objects which are relevant for detection and classification, on the one hand, and may also interfere with ascertaining the color temperature of the surroundings, on the other hand, may occur in lateral sections of the upper and lower image areas.

Furthermore, objects which have been detected and classified in the central image area may also be extrapolated in the upper or lower image areas, for example, lane markings or larger objects such as buildings and trees, so that these parts of the upper and/or lower areas are not used to ascertain the color temperature, but they may also be taken into account for the following algorithms, if necessary.

In addition, a light sensor system function of the camera may be represented and used for additional functions in the vehicle from the second pixel signals of the lower and/or the upper image areas.

The exemplary embodiments and/or exemplary methods of the present invention are explained in greater detail below on the basis of the accompanying drawings with the aid of a few specific embodiments.

DETAILED DESCRIPTION

Figure 1:
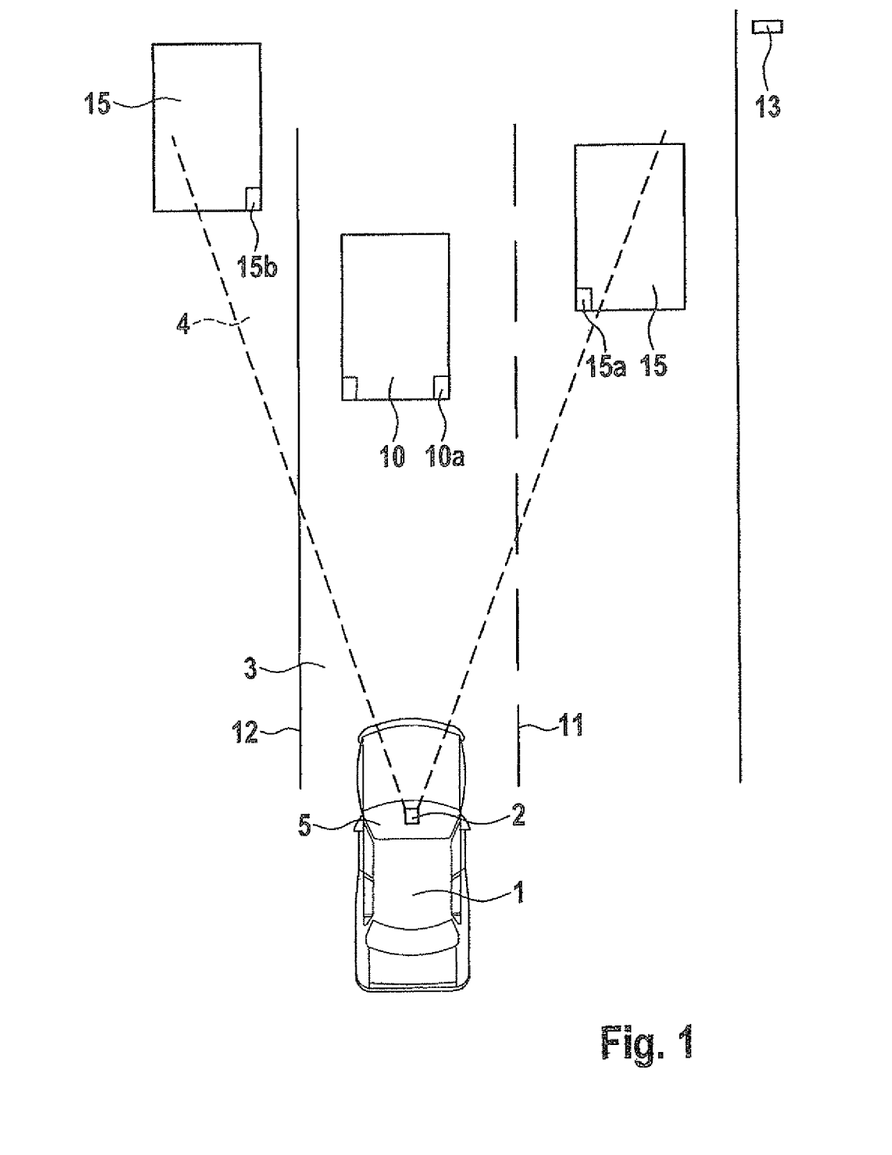
FIG. 1 shows a street scene of a vehicle, having a camera, in a view from above.
Figure 4:
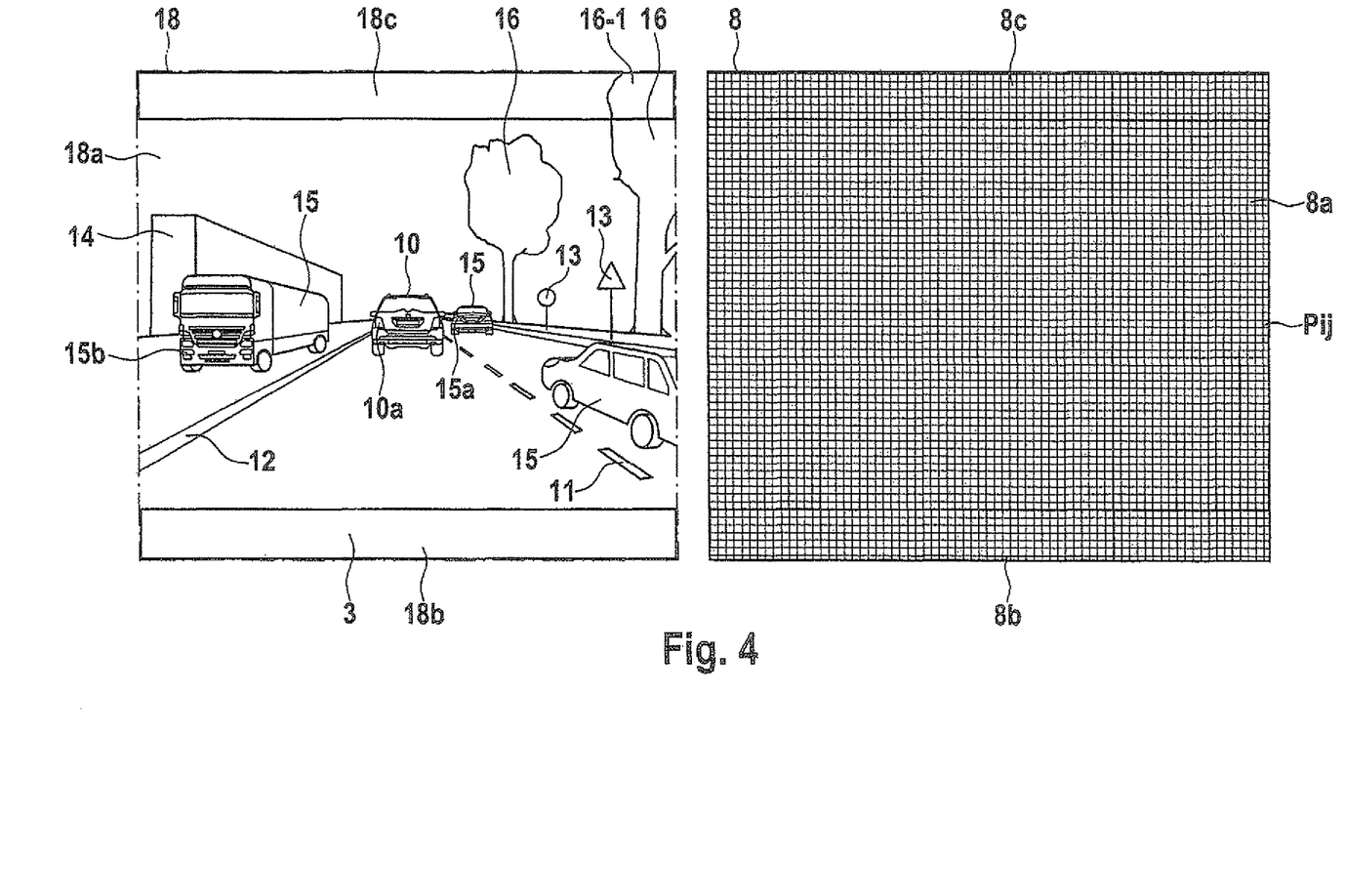
FIG. 4 shows an image detected by the camera as well as the pixel array of the color mask subdivided according to the present invention.

A vehicle 1 having a camera 2 is traveling on a road surface 3. Various objects 10, 11, 12, 13, 14, 15, 16 on or outside of road surface 3 are detected in a detection area 4 of camera 2. According to FIG. 2, camera 2 is mounted behind a window 5 of vehicle 1, in particular windshield 5, and has an image sensor 7 having a sensitive sensor surface on which a matrix configuration of sensor pixels (imager pixels) 7a is implemented (not shown in detail here) in addition to imaging lens 6 (not shown in detail here). A color mask (filter mask) 8 having a matrix configuration of filter pixels Pij according to FIG. 4 is placed on the sensitive sensor surface having sensor pixels 7a. Each filter pixel Pij sits in a manner known per se directly in front of a sensor pixel 7a and filters the incident light in accordance with its color value, i.e., its spectral transmission behavior.

Image sensor 7 absorbs the optical light incident through color mask 8 and outputs image signals S1 to a control and analyzing unit 9, which thus is able to perform an analysis in an appropriate local and color resolution, whereupon the detected image may be displayed on an on board display device and/or a qualitative evaluation may be performed in particular by image processing to output warning messages to the driver, for example, and in particular to also intervene into the vehicle management. FIG. 4 shows at the left the driving scene detected, i.e., image 18 created from image signals S1. Thus, distance regulating systems for adjusting a constant distance from a preceding vehicle 10 as well as lane detection by identifying lane markings 11, 12 may continue to perform a detection of traffic signs 13 and other traffic participants 15. In particular, color values of detected objects 10, 11, 12, 13, 15 may be ascertained and used to identify these objects or partial areas of these objects.

Color mask 8 according to the exemplary embodiments and/or exemplary methods of the present invention is subdivided according to FIG. 4 into areas 8a, 8b, 8c, which thus correspond to image areas 18a, 18b and 18c of image 18. A central area 8a here includes a majority of color mask 8, so that in particular relevant objects 10, 11, 12, 13, 15 fall in the corresponding central image area 18a, in particular other traffic participants 10, 15, traffic signs 13 and lane markings 11, 12. A lower area 8b of color mask 8 corresponds to a lower image area 18b in which a portion of road surface 3, i.e., the road, is in front of vehicle 1. Thus, no relevant objects are initially to be expected in this lower area 8b. If necessary, portions of lane markings 11, 12 may extend into lower area 8b. An upper area 8c of color mask 8 corresponds in image 18 to an upper image area 18c, in which essentially the sky is imaged. The representation in FIG. 4 allows a direct correlation of image 18 to color mask 8, image 18 in fact being also able to be imaged in an inverted or in a mirror-symmetric manner on image sensor 7 using an inverting imaging lens 6, and thus lower area 8b, for example, being situated—physically—at the top of color mask 8. However, the area corresponding to lower image area 18b is understood below to be lower area 8b; the same applies to upper area 18c and 8c.

Areas 8b and 8c may extend over several complete rows of color mask 8, as shown here, or each may include central portions of the upper and lower rows because additional objects, for example, buildings 14 or trees 16, will in all probability also appear at the edge of a road in the lateral areas of a detected image 18 and may extend as far as the upper edge of image 18.

According to the exemplary embodiments and/or exemplary methods of the present invention, lower area 8b and/or upper area 8c are used to ascertain a color temperature or an average color value Fa of image 18. According to the exemplary embodiments and/or exemplary methods of the present invention, it is recognized here that upper image area 18c represents the sky and therefore a uniformly bright lighting without any significant interference with other objects and whose brightness value and spectral composition influence the brightness of overall image 18. The sky, which is included in upper image area 18c, may be white, for example, or may also be reddish in the morning or evening, and black at night. Road surface 3 detected in lower image area 18b generally represents a gray value of the asphalt or of a pavement, which may vary between light gray and black, depending on the composition and total brightness. Asphalt in particular is a suitable subject here for ascertaining a color temperature or an average color value Fa, which accordingly also includes data about the total brightness. Tints of windshield 5 and due to soiling on windshield 5 and possibly in imaging lens 6 are also detected here.

Figure 3:
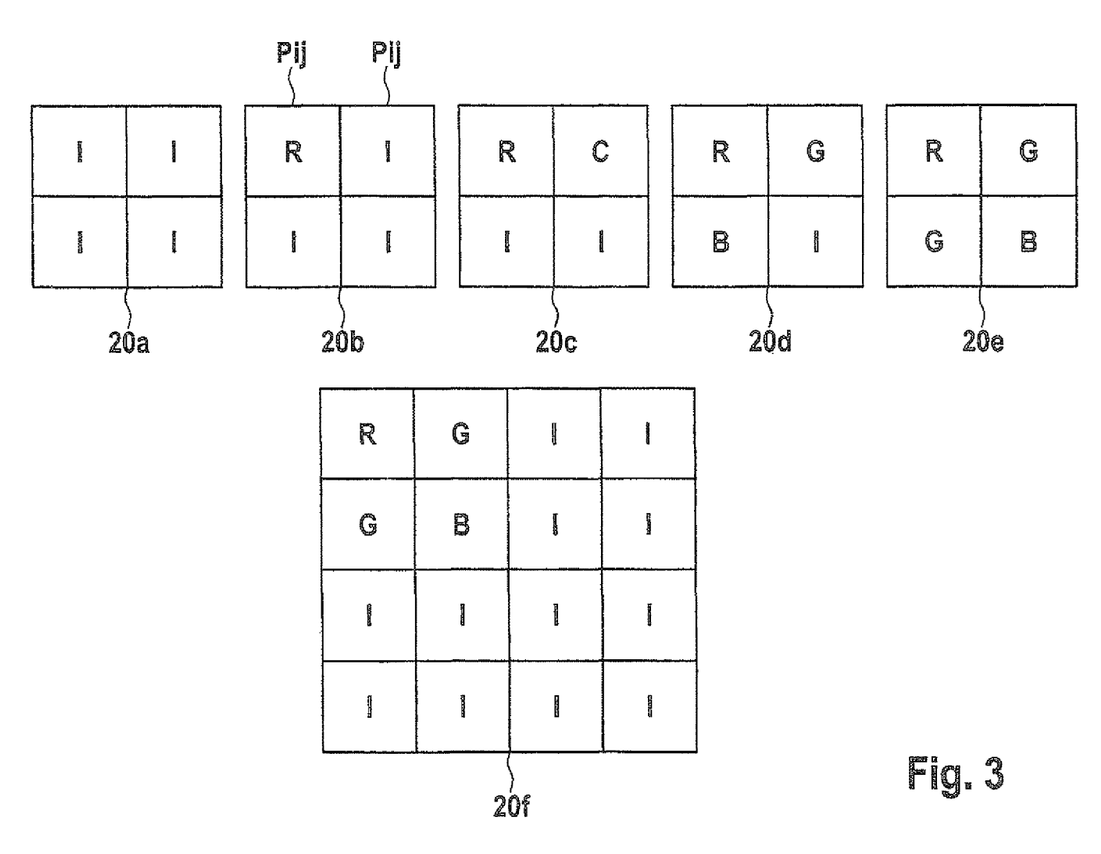
FIG. 3 shows various color patterns.

According to the exemplary embodiments and/or exemplary methods of the present invention, central area 8a of color mask 8 includes a different color pattern than areas 8b and 8c. FIG. 3 shows color patterns 20a to 20f as examples, particular filter pixels Pij being characterized according to the color value. In this case, a transparent pixel is represented as value I, a red pixel as R, a cyan pixel as C, a blue pixel as B and a green pixel as G. Pattern 20a is a 4I pattern, which is thus used as a gray imager and allows only gray values to be ascertained. Color patterns 20b, 20c, 20d and 20f represent partial color patterns having color values R, G, B, C as well as intensity pixels I, 20b being an R3I pattern, 20c being an RC2I pattern, and 20d being an RGBI pattern. Color pattern 20e is a full-color pattern, known here as RGGB or Bayer pattern; 20f is in turn a partial color pattern known as the sparse Bayer pattern.

Central area 8a contains more transparency values I than areas 8b and 8c and may be in particular one of partial color patterns 20b through 20d or 20f. Areas 8b and/or 8c are, for example, full-color pattern 20f. Different full-color patterns may also be provided in areas 8b and 8c, or pattern 20d containing a low proportion of transparency values I may be provided in one of areas 8b or 8c.

Objects may thus be detected in area 18a through partial color patterns 20b, c, d or f used and their color values may be ascertained. Thus, for example, rear lights 10a, 15a may be ascertained as red values, headlights 15b as white or yellow values and accordingly also flashing lights for turning operations may be ascertained as temporarily pulsating yellow values; in addition, the colors of traffic signs 13 and, if necessary, also the color display of a traffic light may be detected. Furthermore, color values of lane markings 11 and 12 may be detected to be able to differentiate, for example, a white tint from a yellow tint. In temporary lane changes, yellow lane markings 11 are additionally applied to road surface 3 without removing the white lane markings, so that then the yellow lane markings 11 should have priority. The colors white and essentially colorless and yellow may be differentiated by mounting one of partial color patterns 20b through 20e in central area 8a according to the exemplary embodiments and/or exemplary methods of the present invention. This may be accomplished by R3I color pattern 20b, for example.

Figure 2:
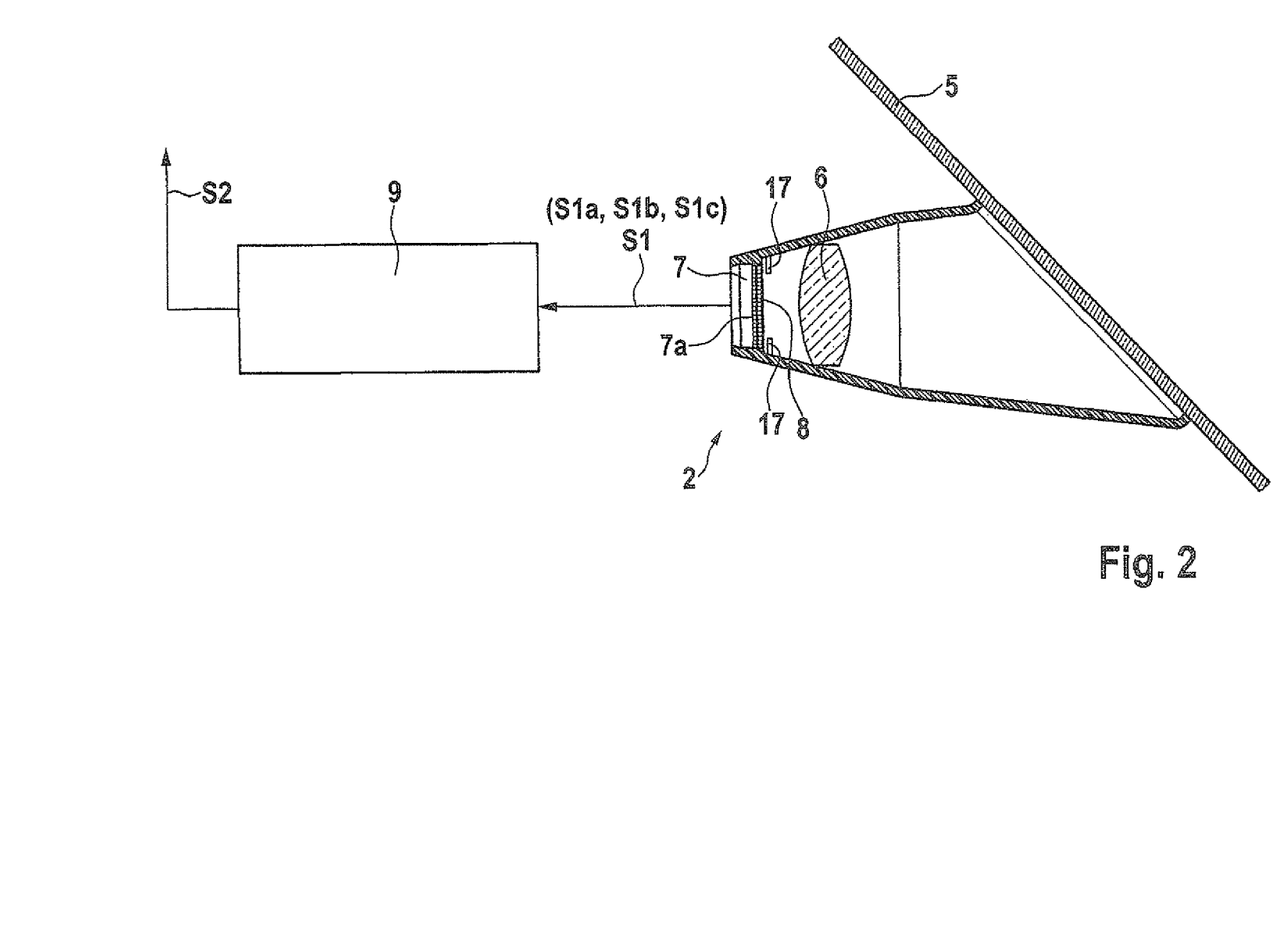
FIG. 2 shows the camera system of the vehicle.

Imager pixels 7a of image sensor 7 behind central area 8a output first pixel signals S1a and imager pixels 7a behind areas 8b and 8c accordingly output second pixel signals S1b and S1c, so that image signals S1 contain these pixel signals S1a, S1b and S1c, as indicated in FIG. 2 with the signal arrow of S1. Control and analyzing unit 9 uses pixel signals S1b and S1c to ascertain an average color value Fa and/or an average brightness value Ha for the white balance, i.e., for correction of all image signals S1 and thus correction of pixel signals S1a. Due to these corrected image signals S1, objects 10, 11, 12, 13, 14, 15 are detected and recognized. Control and analyzing unit 9 accordingly outputs output signals S2, which may be used for driving management intervention measures and also as image signals for graphically representing image 18 on a display device.

Output signals S2 and the detected objects in central image area 18a may additionally also be used to analyze image areas 18b and 18c. In particular, for example, in detecting a lane marking 11 or 12 in central image area 18a, the lane marking may be extrapolated downward to image area 18b, so that contours recognized in image area 18b may be assigned to these lane markings 11 and 12, if necessary. In addition, it may be recognized in FIG. 4 that tree 16 on the right extends upward from central image area 18a and thus an appropriate right partial area 16-1 of upper image area 18c is to be assigned to this tree, i.e., object 16. These partial areas 16-1 in question are thus not used to ascertain average color value Fa and/or average brightness value Ha. Furthermore, the objects detected in these partial areas may also potentially be used to represent an image and for vehicle management intervention measures via output signals S2.

Figure 5:
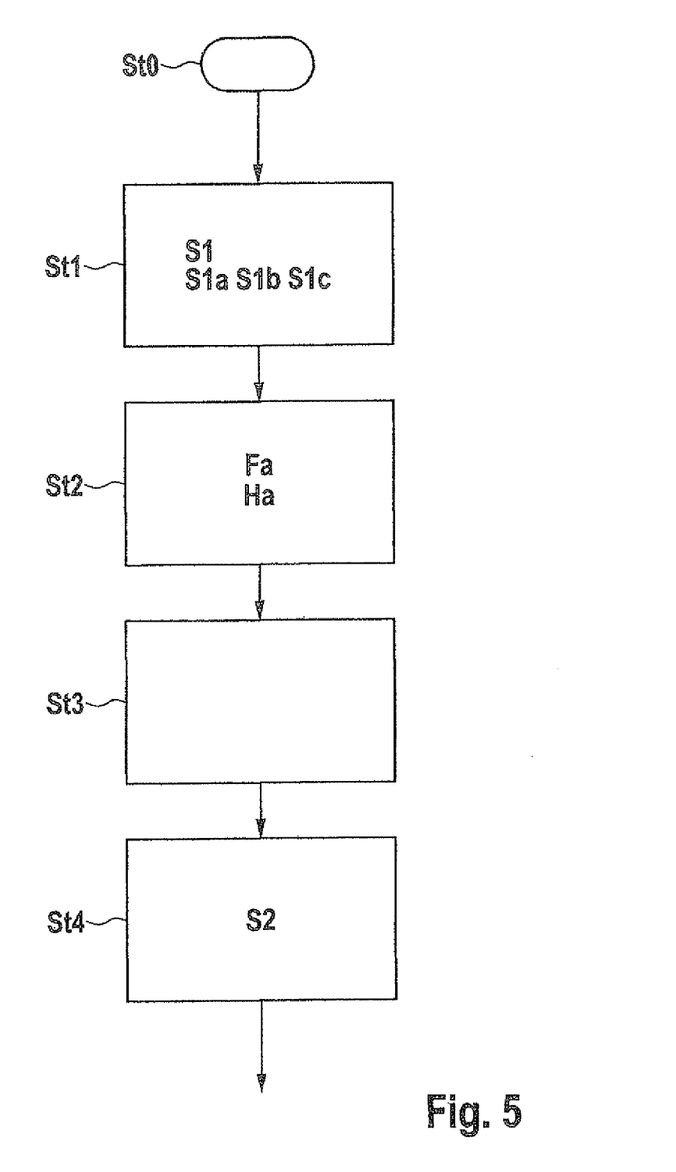
FIG. 5 shows a flow chart of a method according to the present invention.

The method according to the present invention thus starts at step St0 according to FIG. 5, in particular when camera 2 is turned on, whereupon in step St1, image signals S1 are output using pixel signals S1a, S1b, S1c; in step St2, a color temperature, i.e., an average color value Fa and/or an average brightness value Ha, is ascertained for the white balance; corrected pixel values, i.e., image signals, may as a result be formed in step St3, and objects 10, 11, 12, 13, 14, 15, 16 may be identified in image 18, so that output signals S2 are subsequently output in step St4.

According to another specific embodiment, a diffuser which specifically images upper image area 18c and/or lower image area 18b more fuzzily may be introduced into imaging lens 6, so that structures in these image areas do not interfere with the color measurement and ascertainment of an average color value Fa.

In addition, a light sensor system function of the camera may also be represented using second pixel signals S1b and S1c, i.e., these second pixel signals may be used as light sensors for additional functions in the vehicle.

Control and analyzing unit 9 may be configured in such a way that it recognizes permanent basic color values, i.e., colorations from longer measurement periods, e.g., through a tinted windshield 5, and thus may also perform an appropriate white balance even without instantaneous pixel signals S1a and S1b, e.g., using dark image areas 18b and 18c during night driving.

What is claimed is:

1. A color mask for an image sensor of a vehicle camera, the image sensor having a matrix of sensor pixels, the color mask comprising:
   a matrix configuration of filter pixels having different spectral transmission behaviors, the matrix configuration sized to overlay the matrix of sensor pixels, the filter pixels including at least one transparent filter pixel that is transparent for optical light and at least one color filter pixel having a wavelength-selective transmission behavior, each of the filter pixels of the matrix configuration configured to sit in front of a corresponding sensor pixel of the image sensor, wherein the matrix configuration has a central area having a first color pattern and at least one second area having a second color pattern, the at least one second area including an upper area of the matrix configuration above the central area; and wherein the first color pattern and the second color pattern are different repeating configurations of the filter pixels, the first color pattern contains transparent and color filter pixels, the first color pattern has a larger relative proportion of transparent filter pixels than the second color pattern, and the second color pattern is configured as a full-color pattern without any transparent filter pixels.

2. The color mask of claim 1, wherein the at least one second area includes multiple complete rows of the matrix configuration of the filter pixels, and the central area includes more rows of the matrix configuration than the at least one second area.

3. The color mask of claim 1, wherein the second color pattern is configured as an RGGB pattern.

4. The color mask of claim 1, wherein the at least one second area also includes a lower area of the matrix configuration below the central area, which is configured to detect a road surface in front of a vehicle having the vehicle camera.

5. The color mask of claim 1, wherein the upper area of the matrix configuration is configured to detect sky.

6. The color mask of claim 1, wherein the central area is configured to detect objects including at least one of: lane markings, buildings, or trees.

7. The color mask of claim 1, wherein the central area is configured to detect objects at a higher spatial resolution than the at least one second area.

8. The color mask of claim 1, wherein the at least one second area includes a lower area having a third color pattern, the second color pattern and the third color pattern being different repeating configurations of the filter pixels.

9. The color mask of claim 1, wherein a signal from a portion of the image sensor corresponding to at least one second area provides information to determine a quantity including at least one of: an ambient temperature, or a color temperature; and the determined quantity is used to perform at least one of: a white balance on a signal from a portion of the image sensor corresponding to the central area of the color mask, or a color correction on the signal from the portion of the image sensor corresponding to the central area of the color mask.

10. A vehicle camera, comprising:
an image sensor;
the color mask of claim 1; and
a processor to:
  determine, based on a signal from a portion of the image sensor corresponding to the at least one second area of the color mask, a quantity including at least one of: an ambient temperature, or a color temperature; and
  perform, as a function of the determined quantity, at least one of: a white balance on a signal from a portion of the image sensor corresponding to the central area of the color mask, or a color correction on the signal from the portion of the image sensor corresponding to the central area of the color mask.

11. The color mask of claim 1, wherein the central area having the first color pattern and the at least one second area having the second color pattern are located along a same vertical axis.

12. A vehicle camera, comprising:
an image sensor having a matrix of sensor pixels;
a color mask situated in front of the image sensor, wherein the color mask includes:
  a matrix configuration of filter pixels having different spectral transmission behaviors, the matrix configuration sized to overlay the matrix of sensor pixels, the filter pixels including at least one transparent filter pixel that is transparent for optical light and at least one color filter pixel having a wavelength-selective transmission behavior, each of the filter pixels configured to sit in front of a corresponding sensor pixel of the image sensor;
  wherein the matrix configuration has a central area having a first color pattern and at least one second area having a second color pattern, the at least one second area including at least one of: a lower area of the matrix configuration, or an upper area of the matrix configuration; and
  wherein the first color pattern and the second color pattern are different repeating configurations of the filter pixels, and the first color pattern contains transparent and color filter pixels; and
a control and analyzing unit;
wherein the image sensor is configured to output to the control and analyzing unit first pixel signals of the sensor pixels covered with the filter pixels of the central area having the first color pattern and second pixel signals of the sensor pixels covered with the filter pixels of the at least one second area having the second color pattern;
wherein the control and analyzing unit is configured to ascertain from the second pixel signals a quantity including at least one of: an average color value, a color temperature, or an average gray value; and
wherein the control and analyzing unit is configured to use the ascertained quantity to perform at least one of: a white balance of the first pixel signals, or a color correction of the first pixel signals.

13. The vehicle camera of claim 12, wherein the first pixel signals are color corrected, and the control and analyzing unit is configured to ascertain, from the corrected first pixel signals, the objects in a central image area of the image transmitted by the image signals and ascertains color values of the objects and of the partial areas of the objects.

14. The vehicle camera of claim 12, wherein the control and analyzing unit is configured to check whether an object extends into the at least one second area, and partial areas of the at least one second area in which an ascertained object is situated are not used to ascertain the quantity.

15. The vehicle camera of claim 12, wherein an imaging lens and a fuzziness-creating device are situated in front of the image sensor, the fuzziness-creating device creating a diffuse or fuzzy image in the at least one second area.

16. The vehicle camera of claim 15, wherein the fuzziness-creating device is a diffuser.

17. The vehicle camera of claim 12, wherein the central area having the first color pattern and the at least one second area having the second color pattern are located along a same vertical axis.

18. The vehicle camera of claim 12, wherein the at least one second area includes the upper area, which is above the central area and is configured to detect sky.

19. The vehicle camera of claim 18, wherein the at least one second area also includes the lower area, which is below the central area and is configured to detect a road surface in front of a vehicle having the vehicle camera.

20. The vehicle camera of claim 12, wherein the central area is configured to detect objects including at least one of: lane markings, buildings, or trees.

21. The vehicle camera of claim 12, wherein the central area is configured to detect objects at a higher spatial resolution than the at least one second area.

22. The vehicle camera of claim 12, wherein the at least one second area includes the lower area, and the upper area includes a third color pattern, the second color pattern and the third color pattern being different repeating configurations of the filter pixels.

23. A method for processing signals of a vehicle camera, the method comprising:

detecting vehicle surroundings using a camera having an image sensor and a color mask situated in front of the image sensor, the image sensor including a matrix of sensor pixels, the color mask including a matrix configuration of filter pixels having different spectral transmission behaviors, each of the filter pixels configured to sit in front of a corresponding sensor pixel of the image sensor, the matrix configuration having a central area having a first color pattern and at least one second area having a second color pattern, the first color pattern containing transparent and color filter pixels, the at least one second area including at least one of: a lower area of the matrix configuration, or an upper area of the matrix configuration;

recording first pixel signals from sensor pixels situated behind the central area having the first color pattern and second pixel signals from sensor pixels situated behind the at least one second area having the second color pattern;

ascertaining from the second pixel signals a quantity including at least one of: an average color value, a color temperature, or an average gray value; and using the ascertained quantity to perform at least one of: a white balance of the first pixel signals, or a color correction of the first pixel signals.

24. The method of claim 23, wherein the transparent filter pixels are transparent for optical light and the color filter pixels have a wavelength-selective transmission behavior.

25. The method of claim 23, wherein the central area having the first color pattern and the at least one second area having the second color pattern are located along a same vertical axis.

* * * * *